April 24, 1928.
B. E. LLOYD
TOY
Filed Oct. 23, 1923
1,667,353
2 Sheets-Sheet 1
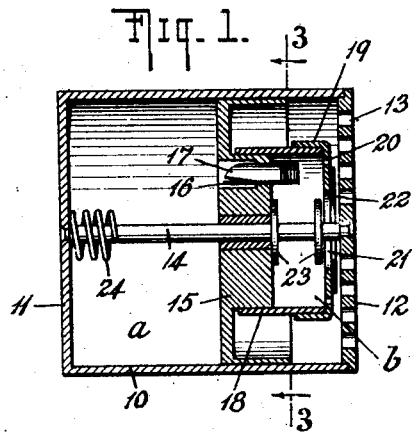
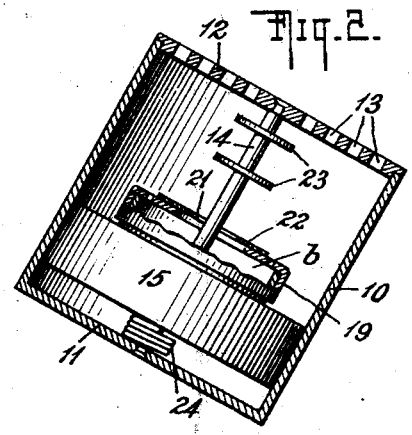
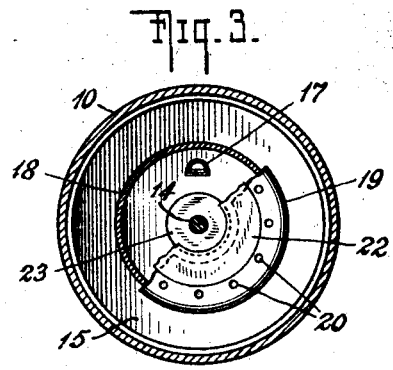
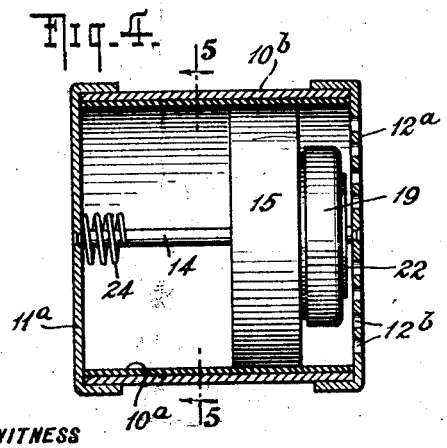
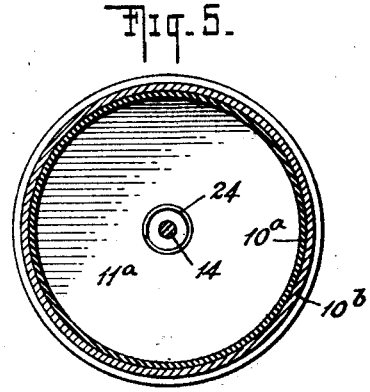
WITNESS
G. V. Rasmussen
INVENTOR
BURT E. LLOYD
BY
ATTORNEYS

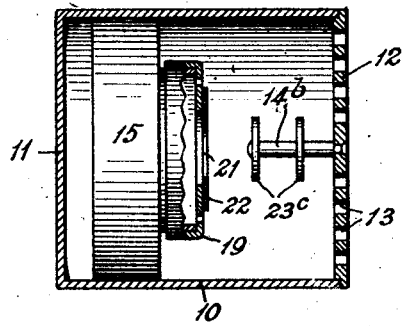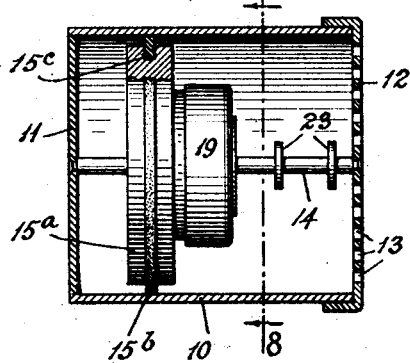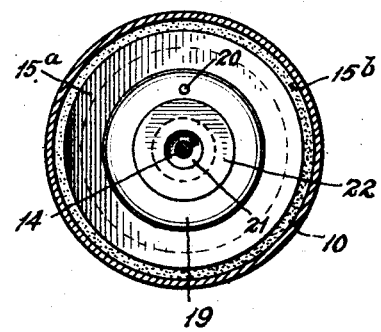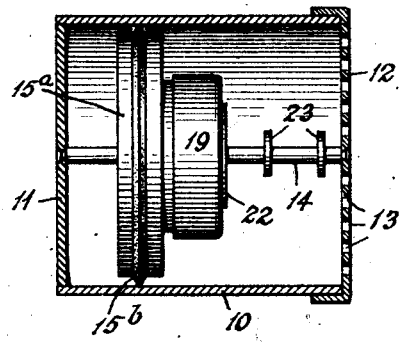

Patented Apr. 24, 1928.

1,667,353

UNITED STATES PATENT OFFICE.

BURT E. LLOYD, OF WOODCLIFFE, NEW JERSEY.

TOY.

Application filed October 23, 1923, Serial No. 670,261, and in Great Britain April 26, 1923.

My invention relates to toys and has for its object to provide a novel and improved sounding device adapted more particularly to be incorporated in dolls and the like for producing sounds in simulation of certain sounds of the human voice. Other more specific objects of the invention will appear from the description hereinafter. The present application is in part a division of another application filed by me in the United States Patent Office on December 8, 1922, Serial No. 605,571.

Reference is to be had to the accompanying drawings which illustrate several forms of the invention without defining its limits and in which Fig. 1 is a sectional view of one form of the device; Fig. 2 is a similar view showing the device in another position; Fig. 3 is a cross-section on the line 3—3 of Fig. 1; Fig. 4 is a view similar to Fig. 1 showing another form of the invention; Fig. 5 is a cross-section thereof on the line 5—5 of Fig. 4; Fig. 6 is a sectional view of still another form of the invention; Figs. 7 and 8 are longitudinal and cross-sections respectively illustrating a still further form thereof and Fig. 9 is a sectional view showing another form of plunger.

The essential features of the invention in whatever form the same may be constructed consist of an air chamber, sound-producing means and a plunger slidably fitting the interior of the air chamber and adapted to force air therefrom to operate the sound-producing means; in its preferred form a means for articulating the sounds emanating from the sound-producing means is combined with the other elements set forth.

In the form shown in Figs. 1, 2 and 3 the air chamber is shown in the form of a metallic cylinder 10 the one end of which is closed as indicated at 11 and the other end of which is provided with a preferably removable cover 12 having a plurality of perforations 13. A stem 14 extends lengthwise of the shell 10 in registry with the axis thereof and has its opposite ends fixed respectively in the closure and the cover 12. In this form a plunger 15 is slidably fitted in the shell 10 in surface engagement with the interior surface thereof and is preferably cup-shaped as illustrated in Fig. 1; the plunger 15 is slidable lengthwise of the stem 14 and is provided with a recess 16 in which a reed or other sound producing device 17 is located so as to communicate with the air chamber $a$ as shown in Fig. 1. The plunger 15 further carries a sleeve 18 or its equivalent which forms a secondary air chamber $b$ and which is closed, for instance, by means of a cap 19 having bleeder-ports 20 and an axial opening 21; a flexible lip 22 constructed for instance, of soft rubber is fixed upon the cap 19 so as to overhang inwardly the opening 21 thereof. A pair of discs 23 of suitable material are fixed upon the stem 14 in spaced relation to each other and so as to be located between the plunger 15 and the perforated cover 12; these discs are of such diameter as to deflect the lip 22 inwardly and outwardly in the operation of the toy for the purpose and in the manner to be more fully described hereinafter. To increase the efficiency of the device and to improve the sound effects thereof, a yielding means is provided for yieldingly resisting the operative movements of the plunger toward its final position. In the illustrated example, as shown in Figs. 1, 2 and 3, this means comprises a coil spring 24 which surrounds the stem 14 between the plunger 15 and the closure 11.

In practice, assuming the parts to occupy the position shown in Fig. 1, the device may be operated by tilting it to the position shown in Fig. 2, to cause the plunger 15 to slidably move toward the closure 11. As the plunger passes from the position shown in Fig. 1 to the position shown in Fig. 2, the air in the chamber $a$ will be forced therefrom through the recess 16 and through the reed 17 or equivalent sound-producing means and will cause the latter to be operated to emit the sound for which it is designed. During the indicated travel of the plunger 15 the lip 22 will successfully engage the discs 23 at spaced intervals and each time will momentarily confine the sound in the auxiliary chamber $b$ and then release the same so that the sounds emanating from the reed 17 or its equivalent will be articulated or otherwise divided in simulation of some predetermined sounds of the human voice. Because of the fact that the lip 22 is made of a flexible material the progress of the plunger 15 will not be interfered with and the co-action of this flexible lip 22 with the discs 23 will produce a very close approximation of a movement of the human lips in framing articulated or other sounds. When the plunger 15 reaches the spring 24 the latter will be compressed and will interpose a yielding resistance to the operative movement of said plunger to its final position whereby the sound emanating from the device 17 will be sustained and not broken off short in an unnatural manner. To repeat the operation the shell 10 is first tilted in the opposite direction and then back again to the position shown in Fig. 2.

In the form shown in Figs. 4 and 5 the shell 10$^a$ of relatively thin metal and corresponding to the shell 10 of Fig. 1 is located within a cylinder 10$^b$ which may be made of pasteboard or other similar material and which has its one end closed by means of a cap 11$^a$ and its other end provided with a cap 12$^a$ having perforations 12$^b$. In this form the plunger 15 is slidably mounted within the shell 10$^a$, this form of the device being otherwise constructed and operating in the same manner as that shown in Figs. 1, 2 and 3.

In the form shown in Fig. 6 the stem which carries the discs instead of extending throughout the axial length of the device is replaced by a short stem 14$^b$ projecting from the one end member, for instance the cover 12 in registry with the axis of the shell 10 as shown. This form of the invention may otherwise be the same as the form shown in Figs. 1, 2 and 3 and may operate in the same way. In other words the only difference resides in the substitution of a short stem 14$^b$ for the longer stem 14 on which the plunger 15 is slidably fitted in Fig. 1.

In the form shown in Figs. 7, 8 and 9 the plunger 15$^a$ is somewhat smaller in diameter than the interior diameter of the cylinder 10$^a$ and is provided with a circumferential member 15$^b$ adapted to slidably engage the inner wall of the cylinder 10$^a$ or its equivalent. The member 15$^b$ is in the nature of a gasket and possesses the characteristic of yielding; to this end the member 15$^b$ may be constructed of rubber or other yielding material either in a single piece as shown or otherwise as may be desired. In the illustrated example the member 15$^b$ comprises a ring of suitable material fitted into a circumferential groove 15$^c$ of the plunger 15$^a$ and fixed therein in any convenient manner. As shown in Fig. 9 the active surface of the member 15$^b$ may be bevelled in two directions instead of being flat as illustrated in Fig. 7.

With this arrangement the plunger is free to move lengthwise of the cylinder 10$^a$ as in the other forms, the member 15$^b$, which comprises a part of said plunger, constituting the means which positively engages the inner surface of said cylinder 10$^a$ and which seals the annular space between the latter and said plunger.

Otherwise the device may be constructed and operate in the same way as any of the other forms of the invention; it will be understood that the plunger 15$^a$ is intended to be representative of all of the forms of plungers shown herein and in the original application of which the present application is in part a division and also of any equivalent forms of plungers which may be used in equivalent arrangements.

The device is extremely simple in construction and does away with the necessity for bellows and other extraneous devices heretofore considered necessary and provides sounds and particularly articulated or otherwise divided sounds which are most natural and lifelike. The device may be used independently as a toy or it may be incorporated in dolls, animal toys, and the like.

Various changes in the specific forms shown and described may be made within the scope of the claims without departing from the spirit of my invention.

I claim:—

1. A device of the kind described comprising a metal shell closed at one end and having its opposite end provided with apertures, a stem extending axially of said shell, a plunger slidably fitting said shell and slidable lengthwise of said stem to compress the air in said shell, a sound-producing device carried by said plunger and operated by the air compressed in said shell, a flexible lip carried by said plunger and spaced discs on said stem co-operating with said lip to articulate the sound emanating from said sound-producing device.

2. A device comprising a cylinder, a cap closing one end thereof, a perforated cap at the other end of said cylinder, a metallic shell constituting a lining for said cylinder, a stem extending axially of said shell and having its ends fixed in said caps, a plunger slidably fitting said shell and slidable lengthwise of said stem to compress the air in said shell, a sound-producing device carried by said plunger and operated by the air compressed in said shell, a flexible lip carried by said plunger and spaced discs on said stem co-operating with said lip to articulate the sound emanating from said sound-producing device.

3. A device of the kind described comprising an air chamber, a plunger slidably fitting the interior of said chamber and adapted to force air therefrom, a sound-producing device carried by said plunger and operated by the air forced from said chamber, a stem extending in the direction of the length of said chamber from one end thereof, spaced discs located on said stem and a flexible lip carried by said plunger whereby the sound emanating from said device is articulated.

4. A device of the kind described comprising an air chamber, a reciprocating gravity actuated plunger in said chamber, the edge of said plunger being spaced from the inner wall of said chamber, a stem having sliding connection with said plunger and thereby adapted to guide the plunger in its movement, said stem being fixedly connected at the end walls of said chamber, a yielding member on said plunger contacting with the inner wall of said chamber and slidably fitting the same and adapted to retard the passage of air between the spaced edge of the plunger and the inner wall of the chamber, a sound producing device and sound chamber carried by said plunger and spaced from the inner wall of said chamber, a sound escape opening in said sound chamber and means to articulate the sound escaping from said sound escape opening.

5. A device of the kind described comprising an air chamber, a stem in said air chamber fixedly connected at a plurality of points, a plunger adapted to reciprocate by gravity in said chamber, a sound chamber and sound producing means carried by said plunger and adapted to reciprocate therewith, the peripheral edge of said plunger and said sound chamber being spaced from the inner wall of said air chamber, said plunger having sliding connection with said stem whereby said plunger is guided in its movement by said stem, resilient means at the peripheral edge of said plunger contacting with the inner wall of the chamber and slidably fitting the same to retard the escape of air between the peripheral edge of said plunger and the inner wall of said chamber, a sound escape opening in said sound chamber and valve mechanism to interrupt the sound escaping from said sound escape opening.

In testimony whereof I have hereunto set my hand.

BURT E. LLOYD.